J. J. HALEY.
Roller for Wringing Machines.

No. 34,142.

Patented Jan'y 14, 1862

WITNESSES:

INVENTOR.
John J. Haley

UNITED STATES PATENT OFFICE.

JOHN J. HALEY, OF SOUTH DEDHAM, MASSACHUSETTS.

IMPROVED ROLLERS FOR WRINGING-MACHINES.

Specification forming part of Letters Patent No. 34,142, dated January 14, 1862.

*To all whom it may concern:*

Be it known that I, JOHN J. HALEY, of South Dedham, in the county of Norfolk and State of Massachusetts, have invented a new and useful Improvement in Rollers for Wringing-Machines, &c.; and I do hereby declare the same to be fully described in the following specification and represented in the accompanying drawings, of which—

Figure 1:
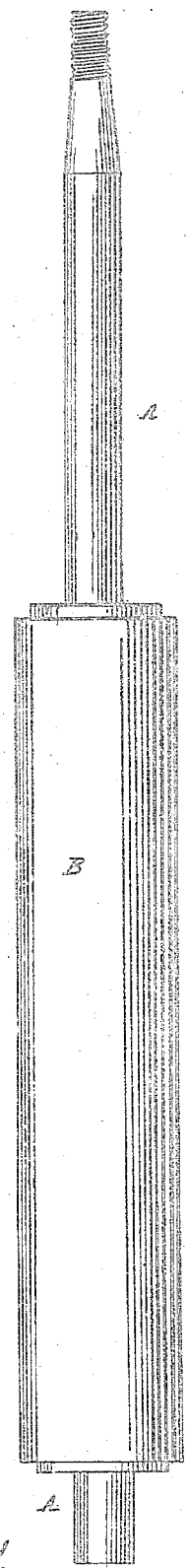
Figure 2:
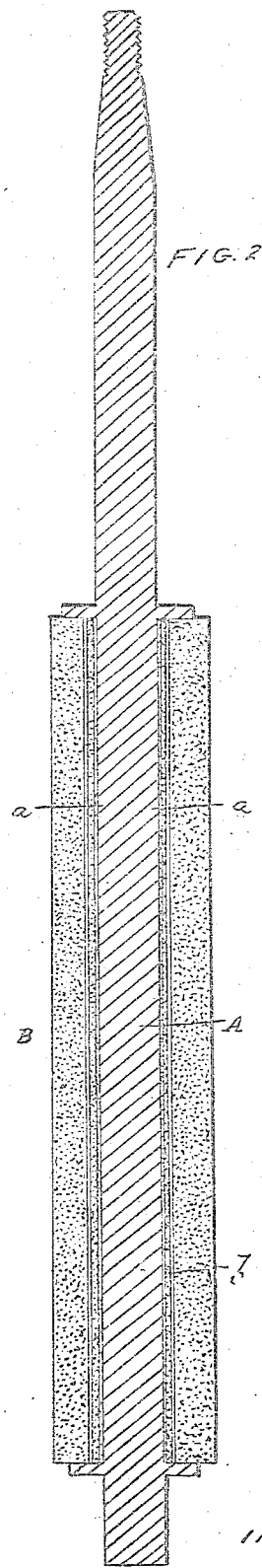

Figure 1 denotes an elevation, and Fig. 2 a central and longitudinal section of the said roller.

It is a fact well known to manufacturers of wringing-machines wherein the water is to be expressed from the clothes by passing between two rollers, which have solid or metallic shafts surrounded by thick tubes of india-rubber, and in many other machines where india-rubber rollers are to be united to metallic shafts, especially when these shafts are small in proportion to the size of the rollers, that it has been found almost impossible to so connect the rubber with the shaft as to prevent the latter from turning around on the former when a very great pressure was brought upon the rubber. To effect a firm connection between the two, various expedients have been resorted to. The surface of the shaft has been coated with india-rubber and various other cements and the tubing drawn closely on the shaft; but the cement would not adhere and under small force applied to it peeled off, and of course allowed the tubing to revolve. The surface of the shaft has also been made rough or with teeth. This soon cut holes in the rubber and rendered the tubing loose. Others have formed longitudinal grooves in the shaft; but this completely failed of reaching the desired result.

To find a means by which a rubber tube could be firmly attached to a hard or metallic surface has been the object of my invention.

In carrying out the same I first cover the metallic shaft A with a coating of varnish $a$, which rigidly adheres to the same. For this purpose I prefer good copal varnish, which is not only very adhesive and firm, but is not injuriously acted on by the iron over this coating, and while the varnish is in a soft state I closely wind a small twine or cord $b$ spirally or at right angles to the axis of the shaft; or instead of the twine a strip of stout cloth or canvas may be tightly wound. To this I apply one or more coatings $c$ of india-rubber or other adhesive cement and allow the same to become dry. Next I apply another coating to the one already dried. Next I give the chamber or bore of the tube B one or more coatings of said rubber or other cement. The rubber tube is next pressed or forced on the shaft and the whole laid aside to dry. I have found that when india-rubber tubes are connected with metallic shafts in my improved manner their connection is so firm and enduring that it is impossible to separate them by any ordinary force.

I do not claim a roller made of a metallic shaft and an india-rubber covering placed concentrically on such shaft; nor do I claim a helix of cord and a coating of glue or cement as a means of connecting one thing to another; but

What I claim as my invention is—

My improved roller, made substantially as described.

JOHN J. HALEY.

Witnesses:
F. P. HALE, Jr.,
J. R. BAMPTON.